(12) United States Patent
Maley et al.

(10) Patent No.: US 11,181,062 B2
(45) Date of Patent: Nov. 23, 2021

(54) EXHAUST GAS RECIRCULATION CONTROL SYSTEMS AND METHODS

(71) Applicant: GM GLOBAL TECHNOLOGY OPERATIONS LLC, Detroit, MI (US)

(72) Inventors: John Maley, Howell, MI (US); Joshua D. Cowgill, Commerce, MI (US); Casey S. Anderson, Commerce Township, MI (US); Douglas C. Sarsen, Hartland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 16/684,141

(22) Filed: Nov. 14, 2019

(65) Prior Publication Data
US 2021/0148294 A1   May 20, 2021

(51) Int. Cl.
| F02D 41/04 | (2006.01) |
| F02B 37/22 | (2006.01) |
| F02D 41/00 | (2006.01) |
| F02M 26/06 | (2016.01) |
| F02B 37/18 | (2006.01) |
| F02M 26/38 | (2016.01) |
| F02M 26/48 | (2016.01) |
| F02M 26/05 | (2016.01) |

(52) U.S. Cl.
CPC .............. *F02D 41/04* (2013.01); *F02B 37/18* (2013.01); *F02B 37/22* (2013.01); *F02D 41/0007* (2013.01); *F02D 41/0052* (2013.01); *F02M 26/05* (2016.02); *F02M 26/06* (2016.02); *F02M 26/38* (2016.02); *F02M 26/48* (2016.02); *F02D 2200/602* (2013.01)

(58) Field of Classification Search
CPC .. F02D 41/04; F02D 41/0007; F02D 41/0047; F02D 41/005; F02D 41/0052; F02D 41/0077; F02D 2200/602; F02M 26/02; F02M 26/05; F02M 26/06; F02M 26/38; F02M 26/48
See application file for complete search history.

(56) References Cited

U.S. PATENT DOCUMENTS

| 4,697,421 | A | * | 10/1987 | Otobe | ................. | F02D 41/0007 60/602 |
| 2004/0050375 | A1 | * | 3/2004 | Arnold | .................... | F02M 26/06 123/568.12 |
| 2004/0134192 | A1 | * | 7/2004 | Umehara | ............... | F02M 26/05 60/605.2 |
| 2006/0117751 | A1 | * | 6/2006 | Todoroki | .............. | F02B 37/001 60/612 |

* cited by examiner

*Primary Examiner* — Jesse S Bogue
*Assistant Examiner* — Loren C Edwards
(74) *Attorney, Agent, or Firm* — Harness, Dickey & Pierce, P.L.C.

(57) ABSTRACT

An engine control system includes: a target air mass module configured to determine a target mass of air within a cylinder of an engine based on a torque request; a boost control module configured to control boost provided by a turbocharger based on the torque request; an exhaust gas recirculation (EGR) control module configured to selectively: set a target opening of an EGR valve based on the target mass of air; set the target opening of the EGR valve to a predetermined minimum opening, where the predetermined minimum opening is greater than zero percent open; and control opening of the EGR valve based on the target opening of the EGR valve.

20 Claims, 4 Drawing Sheets

EXHAUST GAS RECIRCULATION CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internal combustion engines and more particularly to systems and methods for controlling exhaust gas recirculation (EGR).

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

In a feature, an engine control system includes: a target air mass module configured to determine a target mass of air within a cylinder of an engine based on a torque request; a boost control module configured to control boost provided by a turbocharger based on the torque request; an exhaust gas recirculation (EGR) control module configured to selectively: set a target opening of an EGR valve based on the target mass of air; set the target opening of the EGR valve to a predetermined minimum opening, where the predetermined minimum opening is greater than zero percent open; and control opening of the EGR valve based on the target opening of the EGR valve.

In further features, the EGR control module is configured to set the target opening of the EGR valve to the predetermined minimum opening when the target mass of air is in a steady-state condition.

In further features, the EGR control module is configured to set the target opening of the EGR valve to the predetermined minimum opening when a change in the target mass of air over a predetermined period is less than a predetermined mass.

In further features, the EGR control module is configured to set the target opening of the EGR valve based on the target mass of air when the change in the target mass of air over the predetermined period is greater than the predetermined mass.

In further features, the EGR valve is configured to recirculate exhaust gas from downstream of a turbine of the turbocharger to upstream of a compressor of the turbocharger.

In further features, the EGR valve is configured to recirculate exhaust gas from upstream of a turbine of the turbocharger to downstream of a compressor of the turbocharger.

In further features, a target boost module is configured to determine a target boost based on the torque request, and the boost control module is configured to control a geometry of the turbocharger based on the target boost.

In further features, a target boost module configured to determine a target boost based on the torque request, and the boost control module is configured to control opening of a wastegate of the turbocharger based on the target boost.

In further features, the EGR control module is further configured to selectively: set a second target opening of a second EGR valve based on the target mass of air; and set the second target opening of the second EGR valve to a second predetermined minimum opening, where the second predetermined minimum opening is greater than zero percent open; and control opening of the second EGR valve based on the second target opening of the second EGR valve.

In further features, the EGR control module is configured to: set the target opening of the EGR valve to the predetermined minimum opening when a change in the target mass of air over a predetermined period is less than a predetermined mass; set the second target opening of the second EGR valve to the second predetermined minimum opening when the change in the target mass of air over the predetermined period is less than the predetermined mass; set the target opening of the EGR valve based on the target mass of air when the change in the target mass of air over the predetermined period is greater than the predetermined mass; and set the second target opening of the second EGR valve based on the target mass of air when the change in the target mass of air over the predetermined period is greater than the predetermined mass.

In a feature, an engine control method includes: determining a target mass of air within a cylinder of an engine based on a torque request; controlling boost provided by a turbocharger based on the torque request; selectively setting a target opening of an exhaust gas recirculation (EGR) valve based on the target mass of air; selectively setting the target opening of the EGR valve to a predetermined minimum opening, where the predetermined minimum opening is greater than zero percent open; and controlling opening of the EGR valve based on the target opening of the EGR valve.

In further features, the selectively setting the target opening of the EGR valve includes setting the target opening of the EGR valve to the predetermined minimum opening when the target mass of air is in a steady-state condition.

In further features, the selectively setting the target opening of the EGR valve includes setting the target opening of the EGR valve to the predetermined minimum opening when a change in the target mass of air over a predetermined period is less than a predetermined mass.

In further features, the selectively setting the target opening of the EGR valve includes setting the target opening of the EGR valve based on the target mass of air when the change in the target mass of air over the predetermined period is greater than the predetermined mass.

In further features, the EGR valve is configured to recirculate exhaust gas from downstream of a turbine of the turbocharger to upstream of a compressor of the turbocharger.

In further features, the EGR valve is configured to recirculate exhaust gas from upstream of a turbine of the turbocharger to downstream of a compressor of the turbocharger.

In further features, the engine control method further includes determining a target boost based on the torque request, where the controlling the boost includes controlling a geometry of the turbocharger based on the target boost.

In further features, the engine control method further includes determining a target boost based on the torque request, where the controlling the boost includes controlling opening of a wastegate of the turbocharger based on the target boost.

In further features, the engine control method further includes selectively: setting a second target opening of a second EGR valve based on the target mass of air; and setting the second target opening of the second EGR valve to a second predetermined minimum opening, where the second predetermined minimum opening is greater than zero percent open; and controlling opening of the second EGR valve based on the second target opening of the second EGR valve.

In further features, the selectively setting includes: setting the target opening of the EGR valve to the predetermined minimum opening when a change in the target mass of air over a predetermined period is less than a predetermined mass; setting the second target opening of the second EGR valve to the second predetermined minimum opening when the change in the target mass of air over the predetermined period is less than the predetermined mass; setting the target opening of the EGR valve based on the target mass of air when the change in the target mass of air over the predetermined period is greater than the predetermined mass; and setting the second target opening of the second EGR valve based on the target mass of air when the change in the target mass of air over the predetermined period is greater than the predetermined mass.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module (ECM) controls torque output of an engine. More specifically, the ECM controls actuators of the engine based on target values, respectively, determined based on a requested amount of torque. For example, the ECM controls characteristics of a turbocharger (e.g., geometry) based on a target, opening of a wastegate of the turbocharger based on a target wastegate opening, and opening of an exhaust gas recirculation (EGR) valve based on a target EGR opening.

Under steady-state conditions, however, such as under high engine load conditions, the target EGR opening may transition toward or to zero opening, such that the EGR valve becomes closed. According to the present application, the target EGR opening is limited to a predetermined minimum opening to prevent the EGR valve from becoming closed, such as during steady-state conditions. This may provide robustness to any requirement to maintain the EGR valve open.

Figure 1:
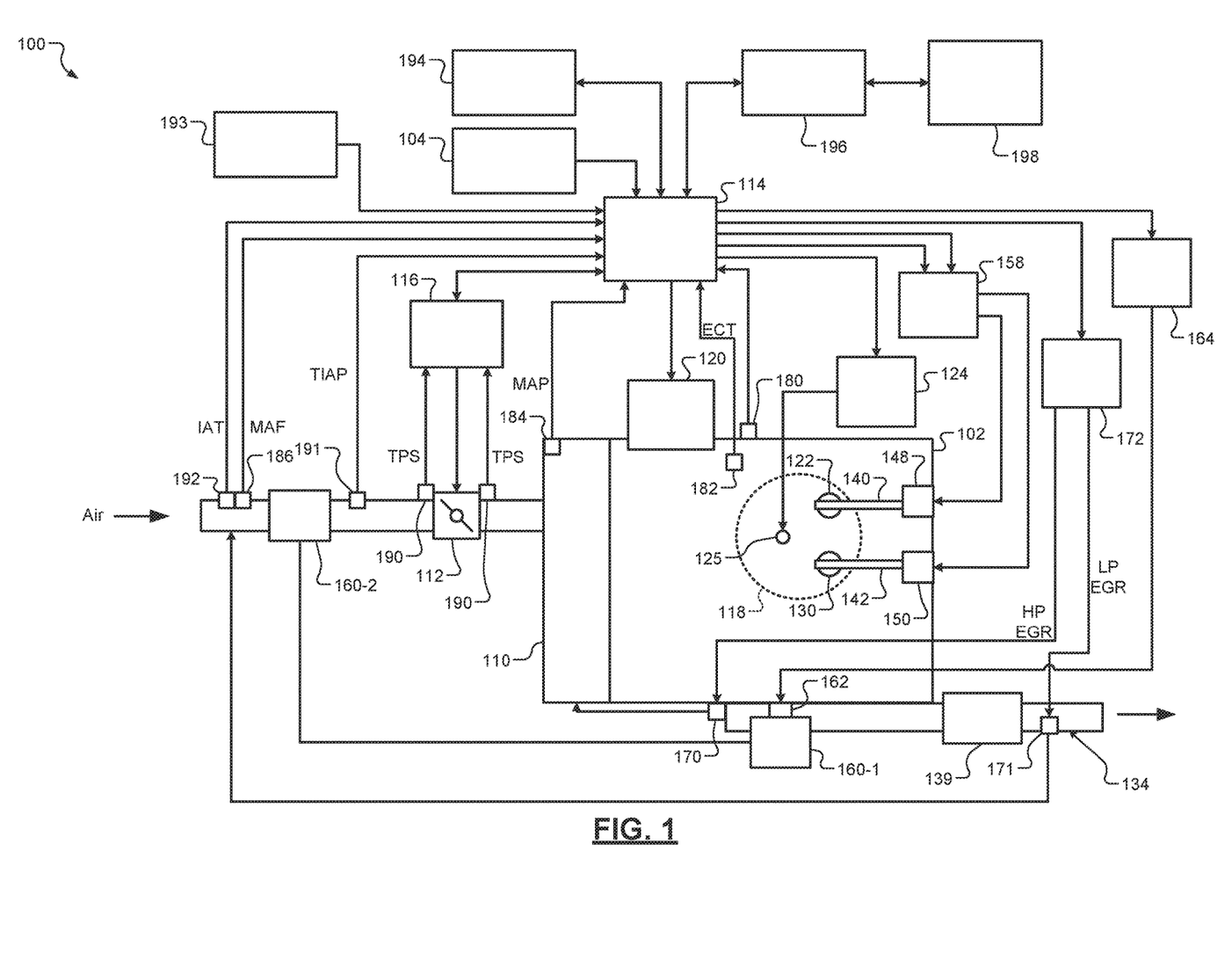
FIG. 1 is a functional block diagram of an example engine system.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a diesel internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. The combustion stroke may also be referred to as the power stroke or the expansion stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection by fuel injectors, such as fuel injector 125. The fuel injectors may inject fuel directly into the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. During the combustion stroke, the combustion of the air/fuel mixture drives the piston away from a top dead center (TDC) position, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134. The exhaust system 134 may include one or more exhaust treatment devices (ETDs) 139 that treat the exhaust before the exhaust is output from the vehicle. Examples of exhaust treatment devices include catalysts (e.g., oxidation catalysts, selective catalytic reduction catalysts), particulate filters (e.g., diesel particulate filters), and other types of exhaust treatment devices.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is driven by hot exhaust gas flowing through the exhaust system 134. The turbocharger also includes a cold air compressor 160-2 that is driven by the turbine 160-1 via a shaft. The compressor 160-2 compresses air leading into the throttle valve 112. The turbocharger may be, for example, a variable geometry turbocharger (VGT) or another suitable type of turbocharger.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 are mechanically attached to each other, so intake air is in close proximity to hot exhaust. Pressurization also increases temperature.

The engine system 100 includes one or more exhaust gas recirculation (EGR) valves that recirculate exhaust back to the intake system. For example, the engine system 100 may include a high pressure (HP) EGR valve 170 that recirculates exhaust gas from upstream of the turbine 160-1 to downstream of the compressor 160-2, such as to the intake manifold 110. Additionally or alternatively to the HP EGR valve 170, the engine system 100 may include a low pressure (LP) EGR valve 171 that recirculates exhaust from downstream of (e.g., all of) the exhaust treatment devices to upstream of the compressor 160-2. An EGR actuator module 172 controls the HP and LP EGR valves 170 and 171 based on signals from the ECM 114. While the example of FIG. 1 illustrates the inclusion of both of the HP EGR valve 170 and the LP EGR valve 171, one of the HP and LP EGR valves 170 and 171 may be omitted.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. A pressure of air input to the throttle valve 112 may be measured using a throttle inlet air pressure (TIAP) sensor 191. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules. In various implementations, the electric motor 198 and the hybrid control module 196 may be omitted.

Each system that varies an engine parameter may be referred to as an engine actuator. For example, the throttle actuator module 116 may adjust opening of the throttle valve 112 to achieve a target throttle opening area. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the HP EGR valve 170 to achieve a target EGR opening area. The EGR actuator module 172 may also control the LP EGR valve 171 to achieve a target EGR opening area. The boost actuator module 164 controls the wastegate 162 to achieve a target wastegate opening area. The cylinder actuator module 120 controls cylinder deactivation to achieve a target number of activated or deactivated cylinders. In various implementations, the cylinder actuator module 120 and cylinder activation/deactivation may be omitted.

The ECM 114 generates the target values for the engine actuators to cause the engine 102 to generate a target engine output torque.

Figure 2:
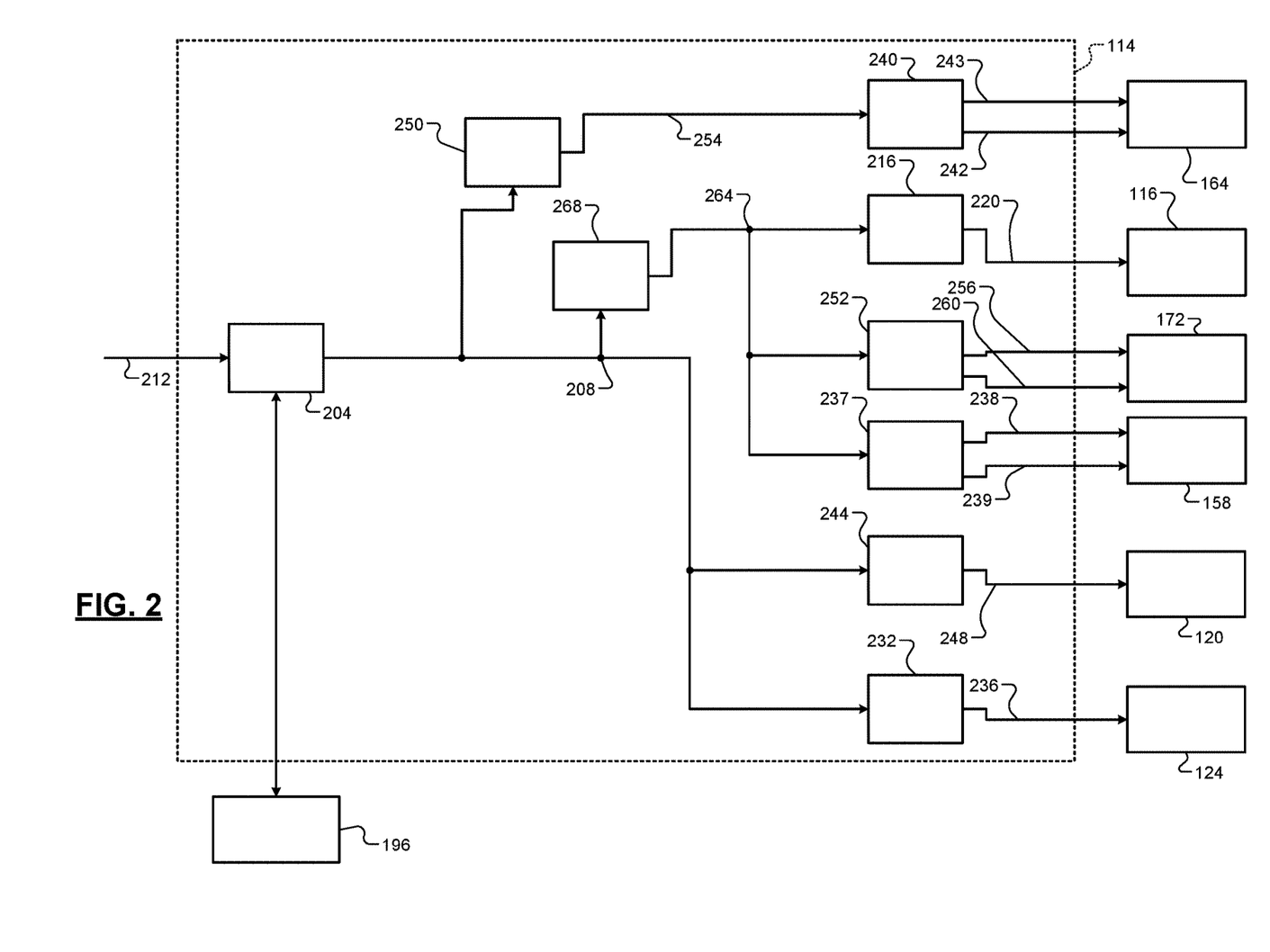
FIG. 2 is a functional block diagram of an example engine control system.

Referring now to FIG. 2, a functional block diagram of an example engine control system is presented. A torque request module 204 determines a torque request 208 for the engine 102 based on one or more inputs 212. The inputs 212 may include, for example, an accelerator pedal position, a brake pedal position, a cruise control input, and/or one or more other suitable inputs. For example, the torque request module 204 may increase the torque request 208 as the APP increases (relative to a predetermined resting APP) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

The ECM 114 controls one or more engine actuators based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A fuel control module 232 determines one or more target fueling parameters 236 based on the torque request 208. For example, the target fueling parameters 236 may include a target equivalence ratio (EQR) or mass of fuel, number of fuel injections per combustion event, and timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively.

A boost control module 240 sets a target wastegate opening 242 based on the torque request 208. The boost actuator module 164 controls opening of the wastegate 162 based on the target wastegate opening 242. For example only, the boost actuator module 164 may determine a target duty cycle (DC) to apply to the wastegate 162 based on the target wastegate opening 242 using an equation or a lookup table that relates target wastegate openings to target DCs. The boost actuator module 164 may apply a signal to the wastegate 162 based on the target DC.

Additionally or alternatively to setting the target wastegate opening 242, the boost control module 240 sets a target turbo configuration 243 based on the torque request 208. The target turbo configuration 243 may include, for example, a position of vanes of the turbocharger, a geometry of the turbocharger, or another suitable parameter. The boost actuator module 164 controls the turbocharger turbine and/or the turbocharger compressor based on the target turbo configuration 243.

A cylinder control module 244 generates cylinder activation/deactivation commands 248 based on the torque request 208. The cylinder actuator module 120 deactivates the intake and exhaust valves of the cylinders based on the activation/deactivation commands 248.

The fuel control module 232 halts fueling of deactivated cylinders. The fuel control module 232 sets the target fueling parameters 236 to provide fuel to activated cylinders. Cylinder deactivation is different than fuel cutoff (e.g., deceleration fuel cutoff). When a cylinder is deactivated, the cylinder's intake and exhaust valves are maintained closed. When fuel is cutoff to a cylinder, the cylinder's intake and exhaust valves may still be opened and closed. The fuel control module 232 may cutoff fuel to one, more than one, or all of the cylinders of the engine, for example, during vehicle deceleration. This may decrease fuel consumption of the engine 102.

An EGR control module 252 determines a target LP EGR opening 256 and a target HP EGR opening 260 based on the torque request 208. The EGR actuator module 172 controls opening of the LP EGR valve 171 based on the target LP EGR opening 256. The EGR actuator module 172 controls opening of the HP EGR valve 170 based on the target HP EGR opening 260. For example only, the EGR actuator module 172 may determine target DCs to apply to the LP and HP EGR valves 171 and 170 based on the target LP and HP EGR openings 256 and 260, respectively, using an equation or a lookup table that relates target EGR openings to target DCs. The EGR actuator module 172 may apply signals to the LP and HP EGR valves 171 and 170 based on the target DCs.

More specifically, as shown in FIG. 2, a target boost module 250 sets a target boost 254 based on the torque request 208. The target boost module 250 may determine the target boost 254, for example, using one of an equation and a lookup table that relates torque requests to target boosts.

The boost control module 240 sets the target wastegate opening 242 based on the target boost 254. The boost control module 240 may determine the target wastegate opening 242, for example, using one of a function and a lookup table that relates target boosts to target wastegate openings. The boost control module 240 may additionally or alternatively set the target turbo configuration 243 based on the target boost 254. The boost control module 240 may determine the target turbo configuration 243, for example, using one of a function and a lookup table that relates target boosts to target turbo configurations.

The throttle control module 216 sets the target throttle opening 220 based on a target air mass 264 within each cylinder. The throttle control module 216 may determine the target throttle opening 220, for example, using one of a function and a lookup table that relates target air masses to target throttle openings. The phaser control module 237 sets the target intake and exhaust phaser angles 238 and 239 based on the target air mass 264. The phaser control module 237 may determine the target intake and exhaust phaser angles 238 and 239, for example, using one of a function and a lookup table that relates target air masses to target intake and exhaust cam phaser angles.

As discussed further below, the EGR control module 252 sets the target LP and HP EGR openings 256 and 260 based on the target air mass 264. The EGR control module 252 may determine the target LP and HP EGR openings 256 and 260, for example, using one of a function and a lookup table that relates target air masses to target LP and HP EGR openings.

When the target air mass 264 is in a steady-state condition, however, the EGR control module 252 lower limits the target LP and HP EGR openings 256 and 260 to predetermined minimum LP and HP EGR openings, respectively. This prevents the LP and HP EGR valves 171 and 170 from being closed.

A target air mass module 268 determines the target air mass 264 based on the torque request 208. The target air mass module 268 may determine the target air mass 264, for example, using one of an equation and a lookup table that relates torque requests to target air masses. The target air mass 264 may be a target amount of air to be trapped within the next cylinder in a predetermined firing order of the cylinders for combustion.

Figure 3:
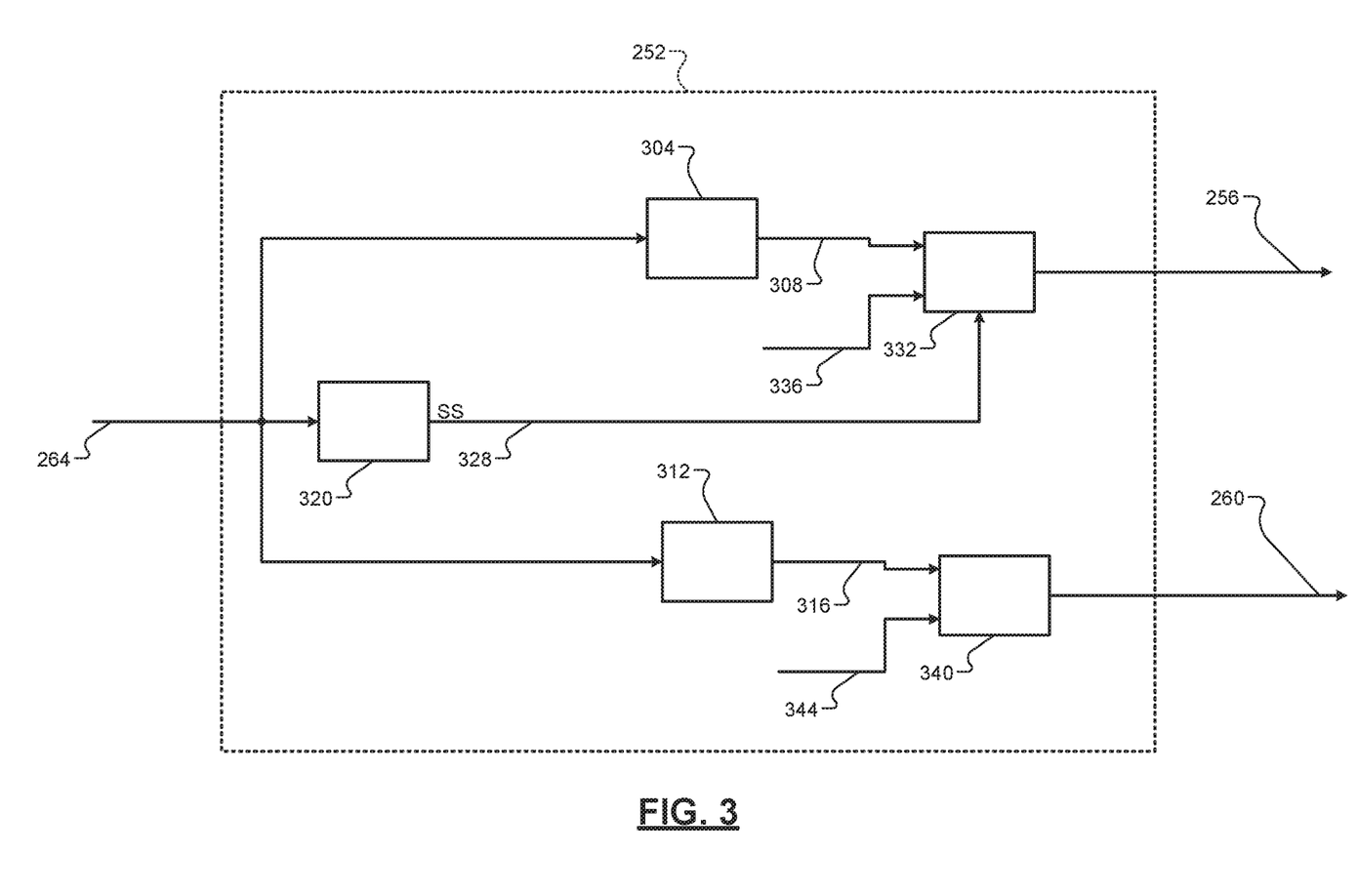
FIG. 3 is a functional block diagram of an example implementation of an EGR control module.

FIG. 3 is a functional block diagram of an example implementation of the EGR control module 252. A target LP module 304 determines a target LP EGR opening 308 based on the target air mass 264. The target LP EGR opening 308 is a target opening of the LP EGR valve 171. The target LP module 304 may determine the target LP EGR opening 308 using one of an equation and a lookup table that relates target air masses to target LP EGR openings.

A target HP module 312 determines a target HP EGR opening 316 based on the target air mass 264. The target HP EGR opening 316 is a target opening of the HP EGR valve 170. The target HP module 312 may determine the target HP EGR opening 316 using one of an equation and a lookup table that relates target air masses to target HP EGR openings.

The target HP and LP EGR openings 316 and 308, however, may approach or reach zero percent opening when the target air mass 264 is in a steady-state (SS) condition, such as when an engine load is near a maximum engine load. This could cause the HP and LP EGR valves 170 and 171 to be closed, which may cause non-compliance with one or more regulations.

A SS module 320 indicates whether the target air mass 264 is in the SS condition. For example, the SS module 320 may set an SS signal 328 to a first state when the target air mass 264 is in the SS condition and set the SS signal 328 to a second state when the target air mass is not in the SS condition. The SS module 320 may determine whether the target air mass 264 is in the SS condition at a time based on a difference between (a) the target air mass 264 at that time and (b) the target air mass 264 a predetermined period before that time. The SS module 320 may determine that the target air mass 264 is in the SS condition at the time, for example, when the difference (e.g., an absolute value of the difference) is less than a predetermined value. The SS module 320 may determine that the target air mass 264 is not in the SS condition when the difference is greater than or equal to the predetermined mass. The predetermined mass may be calibratable and may be, for example, approximately 10-20 milligrams or another suitable mass.

When the target air mass 264 is in the SS condition (when the SS signal 328 is in the first state), a maximum module 332 sets the target LP EGR opening 256 to the greater one of (a) the target LP EGR opening 308 and (b) a predetermined minimum LP EGR opening 336. More specifically, when the target air mass 264 is in the SS condition, the maximum module 332 sets the target LP EGR opening 256 to the target LP EGR opening 308 when the target LP EGR opening 308 is greater than the predetermined minimum LP EGR opening 336. When the target air mass 264 is in the SS condition, the maximum module 332 sets the target LP EGR opening 256 to the predetermined minimum LP EGR opening 336 when the predetermined minimum LP EGR opening 336 is greater than the target LP EGR opening 308.

The predetermined minimum LP EGR opening 336 is stored in memory and is greater than zero percent opening. The predetermined minimum LP EGR opening 336 may correspond to a minimum opening of the LP EGR valve 171 that can reliably/accurately be controlled to. The predetermined minimum LP EGR opening 336 may be calibratable (e.g., by a supplier of the LP EGR valve 171) and may be, for example, approximately 5 percent open area or another suitable opening of the LP EGR valve 171. The predetermined minimum LP EGR opening 336 ensures that the LP EGR valve 171 is maintained open, such as in high engine load conditions.

When the target air mass 264 is in the SS condition (when the SS signal 328 is in the first state), a maximum module 340 sets the target HP EGR opening 260 to the greater one of (a) the target HP EGR opening 316 and (b) a predetermined minimum HP EGR opening 344. More specifically, when the target air mass 264 is in the SS condition, the maximum module 340 sets the target HP EGR opening 260 to the target HP EGR opening 316 when the target HP EGR opening 316 is greater than the predetermined minimum HP EGR opening 344. When the target air mass 264 is in the SS condition, the maximum module 340 sets the target HP EGR opening 260 to the predetermined minimum HP EGR opening 344 when the predetermined minimum HP EGR opening 344 is greater than the target HP EGR opening 316.

The predetermined minimum HP EGR opening 344 is stored in memory and is greater than zero percent opening. The predetermined minimum HP EGR opening 344 may correspond to a minimum opening of the HP EGR valve 170 that can reliably/accurately be controlled to. The predetermined minimum HP EGR opening 344 may be calibratable (e.g., by a supplier of the HP EGR valve 170) and may be, for example, approximately 5 percent open area or another suitable opening of the HP EGR valve 170. The predetermined minimum HP EGR opening 344 ensures that the HP EGR valve 170 is maintained open, such as in high engine load conditions.

Figure 4:
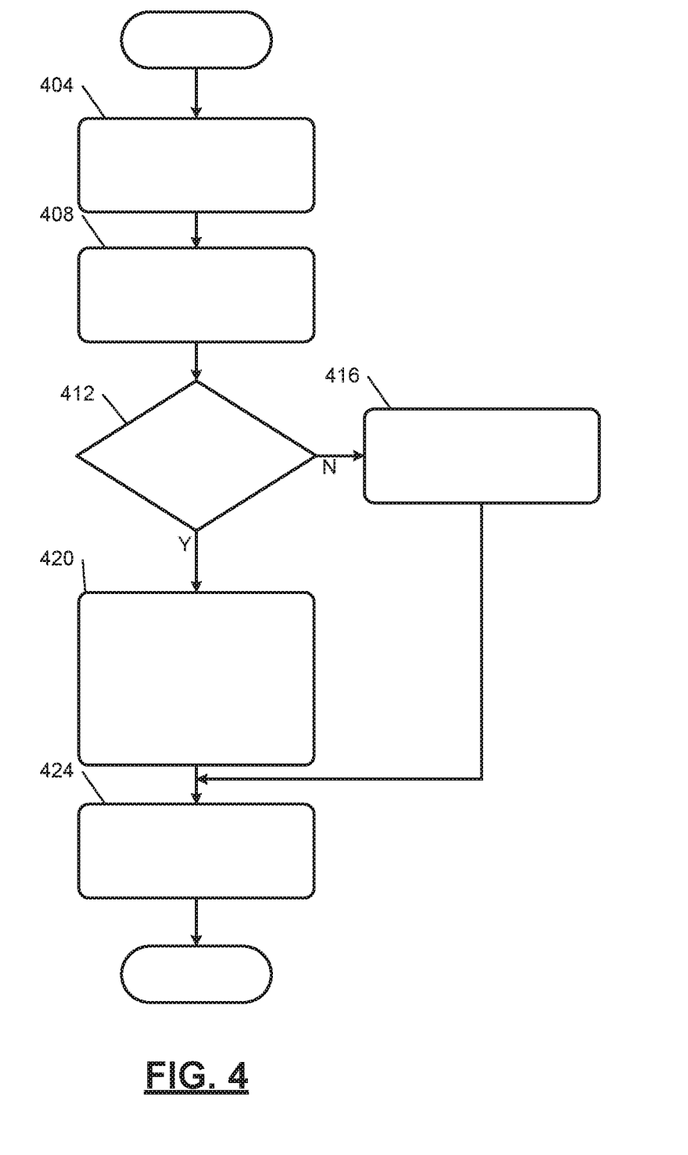
FIG. 4 is a flowchart depicting an example method of controlling exhaust gas recirculation (EGR).

FIG. 4 is a flowchart depicting an example method of controlling opening of an EGR valve, such as the LP EGR valve 171. While the example of FIG. 4 will be discussed with respect to the LP EGR valve 171, the example of FIG. 4 is also applicable to the HP EGR valve 170.

Control begins with 404 where the target air mass module 268 determines the target air mass 264. Boost provided by the turbocharger is controlled based on the target boost 254. Opening of the LP EGR valve 171 is controlled based on the target air mass 264, as discussed above.

At 408, the target LP module 304 determines the target LP EGR opening 308 for the LP EGR valve 171 based on the target air mass 264. At 412, the SS module 320 determines whether the target air mass 264 is in the SS condition. If 412 is false, the SS module 320 sets the SS signal 328 to the second state, and control continues with 416. If 412 is true, the SS module 320 sets the SS signal 328 to the first state, and control continues with 424.

At 416, the maximum module 332 sets the target LP EGR opening 256 equal to the target LP EGR opening 308, and control continues with 424. At 420, the maximum module 332 sets the target LP EGR opening 256 equal to the greater one of the target LP EGR opening 308 and the predetermined minimum LP EGR opening 336, and control continues with 424. Use of the predetermined minimum LP EGR opening 336 prevents the LP EGR valve 171 from being completely closed during the SS condition. At 424, the EGR actuator module 172 controls the LP EGR valve 171 based on the target LP EGR opening 256. While the example of FIG. 4 is shown as ending, control may return to 404 for a next loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An engine control system comprising:
a target air mass module configured to determine a target mass of air within a cylinder of an engine based on a torque request;
a boost control module configured to control boost provided by a turbocharger based on the torque request;
an exhaust gas recirculation (EGR) control module configured to selectively:
set a target opening of an EGR valve based on the target mass of air;
set the target opening of the EGR valve to a predetermined minimum opening,
wherein the predetermined minimum opening is greater than zero percent open; and
control opening of the EGR valve based on the target opening of the EGR valve,
wherein the EGR control module is configured to set the target opening of the EGR valve to the predetermined minimum opening when a change in the target mass of air over a predetermined period is less than a predetermined mass.

2. The engine control system of claim 1 wherein the EGR control module is configured to also set the target opening of the EGR valve to the predetermined minimum opening when the target mass of air is in a steady-state condition.

3. The engine control system of claim 1 wherein the EGR control module is configured to set the target opening of the EGR valve based on the target mass of air when the change in the target mass of air over the predetermined period is greater than the predetermined mass.

4. The engine control system of claim 1 further comprising the EGR valve,
wherein the EGR valve is configured to recirculate exhaust gas from downstream of a turbine of the turbocharger to upstream of a compressor of the turbocharger.

5. The engine control system of claim 1 further comprising the EGR valve,
wherein the EGR valve is configured to recirculate exhaust gas from upstream of a turbine of the turbocharger to downstream of a compressor of the turbocharger.

6. The engine control system of claim 1 further comprising a target boost module configured to determine a target boost based on the torque request,
wherein the boost control module is configured to control a geometry of the turbocharger based on the target boost.

7. The engine control system of claim 1 further comprising a target boost module configured to determine a target boost based on the torque request,
wherein the boost control module is configured to control opening of a wastegate of the turbocharger based on the target boost.

8. The engine control system of claim 1 wherein the EGR control module is further configured to selectively:
set a second target opening of a second EGR valve based on the target mass of air; and
set the second target opening of the second EGR valve to a second predetermined minimum opening,
wherein the second predetermined minimum opening is greater than zero percent open; and
control opening of the second EGR valve based on the second target opening of the second EGR valve.

9. The engine control system of claim 8 wherein the EGR control module is configured to:
set the target opening of the EGR valve to the predetermined minimum opening when a change in the target mass of air over a predetermined period is less than a predetermined mass;
set the second target opening of the second EGR valve to the second predetermined minimum opening when the change in the target mass of air over the predetermined period is less than the predetermined mass;
set the target opening of the EGR valve based on the target mass of air when the change in the target mass of air over the predetermined period is greater than the predetermined mass; and
set the second target opening of the second EGR valve based on the target mass of air when the change in the target mass of air over the predetermined period is greater than the predetermined mass.

10. An engine control method comprising:
determining a target mass of air within a cylinder of an engine based on a torque request;
controlling boost provided by a turbocharger based on the torque request;
selectively setting a target opening of an exhaust gas recirculation (EGR) valve based on the target mass of air;
selectively setting the target opening of the EGR valve to a predetermined minimum opening,
wherein the predetermined minimum opening is greater than zero percent open; and
controlling opening of the EGR valve based on the target opening of the EGR valve,
wherein the selectively setting the target opening of the EGR valve includes setting the target opening of the EGR valve to the predetermined minimum opening when a change in the target mass of air over a predetermined period is less than a predetermined mass.

11. The engine control method of claim 10 wherein the selectively setting the target opening of the EGR valve includes also setting the target opening of the EGR valve to the predetermined minimum opening when the target mass of air is in a steady-state condition.

12. The engine control method of claim 10 wherein the selectively setting the target opening of the EGR valve includes setting the target opening of the EGR valve based on the target mass of air when the change in the target mass of air over the predetermined period is greater than the predetermined mass.

13. The engine control method of claim 10 wherein the EGR valve is configured to recirculate exhaust gas from downstream of a turbine of the turbocharger to upstream of a compressor of the turbocharger.

14. The engine control method of claim 10 wherein the EGR valve is configured to recirculate exhaust gas from upstream of a turbine of the turbocharger to downstream of a compressor of the turbocharger.

15. The engine control method of claim 10 further comprising determining a target boost based on the torque request,
wherein the controlling the boost includes controlling a geometry of the turbocharger based on the target boost.

16. The engine control method of claim 10 further comprising determining a target boost based on the torque request,
wherein the controlling the boost includes controlling opening of a wastegate of the turbocharger based on the target boost.

17. The engine control method of claim 10 further comprising selectively:

setting a second target opening of a second EGR valve based on the target mass of air; and setting the second target opening of the second EGR valve to a second predetermined minimum opening, wherein the second predetermined minimum opening is greater than zero percent open; and controlling opening of the second EGR valve based on the second target opening of the second EGR valve.

18. The engine control method of claim 17 wherein the selectively setting includes:

setting the target opening of the EGR valve to the predetermined minimum opening when a change in the target mass of air over a predetermined period is less than a predetermined mass;

setting the second target opening of the second EGR valve to the second predetermined minimum opening when the change in the target mass of air over the predetermined period is less than the predetermined mass;

setting the target opening of the EGR valve based on the target mass of air when the change in the target mass of air over the predetermined period is greater than the predetermined mass; and setting the second target opening of the second EGR valve based on the target mass of air when the change in the target mass of air over the predetermined period is greater than the predetermined mass.

19. An engine control system comprising:

a target air mass module configured to determine a target mass of air within a cylinder of an engine based on a torque request;

a boost control module configured to control boost provided by a turbocharger based on the torque request;

an exhaust gas recirculation (EGR) control module configured to selectively:

set a target opening of an EGR valve based on the target mass of air;

set the target opening of the EGR valve to a predetermined minimum opening, wherein the predetermined minimum opening is greater than zero percent open; and control opening of the EGR valve based on the target opening of the EGR valve, wherein the EGR control module is further configured to selectively:

set a second target opening of a second EGR valve based on the target mass of air; and set the second target opening of the second EGR valve to a second predetermined minimum opening, wherein the second predetermined minimum opening is greater than zero percent open; and control opening of the second EGR valve based on the second target opening of the second EGR valve.

20. An engine control method comprising:

determining a target mass of air within a cylinder of an engine based on a torque request;

controlling boost provided by a turbocharger based on the torque request;

selectively setting a target opening of an exhaust gas recirculation (EGR) valve based on the target mass of air;

selectively setting the target opening of the EGR valve to a predetermined minimum opening, wherein the predetermined minimum opening is greater than zero percent open;

controlling opening of the EGR valve based on the target opening of the EGR valve;

setting a second target opening of a second EGR valve based on the target mass of air;

setting the second target opening of the second EGR valve to a second predetermined minimum opening, wherein the second predetermined minimum opening is greater than zero percent open; and controlling opening of the second EGR valve based on the second target opening of the second EGR valve.

* * * * *